US005841576A

United States Patent [19]
Aikawa

[11] Patent Number: 5,841,576
[45] Date of Patent: Nov. 24, 1998

[54] MICROSCOPE CAPABLE OF BEING FITTED WITH STRAP

[75] Inventor: Yasuyuki Aikawa, Kawasaki, Japan

[73] Assignee: Nikon Corporation, Tokyo, Japan

[21] Appl. No.: 735,749

[22] Filed: Oct. 23, 1996

[30]     Foreign Application Priority Data

Feb. 9, 1996   [JP]   Japan ..................................... 8-023890

[51] Int. Cl.⁶ ............................ G02B 21/00; G02B 21/24
[52] U.S. Cl. ........................... 359/383; 359/368; 359/392
[58] Field of Search .................................... 359/382, 383, 359/392, 368, 374–378, 409, 410, 411, 480; D16/131

[56]                  References Cited

U.S. PATENT DOCUMENTS 182,919  10/1876  Gundlach ................................. 359/383

3,804,486  4/1974  Van Exel et al. ........................ 359/375

FOREIGN PATENT DOCUMENTS 768742  2/1957  United Kingdom ................... 359/409

*Primary Examiner*—Jon W. Henry

[57]                  ABSTRACT

A microscope capable of being fitted with a strap includes a microscope unit incorporating an optical system, a focusing unit supporting the microscope unit and movable to focus the optical system on an object to be observed, and a stage serving as a sustainer base for sustaining the microscope through the focusing unit. The focusing unit is provided with a strap fitting portion.

4 Claims, 6 Drawing Sheets

MICROSCOPE CAPABLE OF BEING FITTED WITH STRAP

BACKGROUND OF THE INVENTION

1. Field of the Invention

The present invention relates to a microscope and, more particularly, to a portable microscope.

2. Related Background Art

FIG. 1 is a side view illustrating an appearance of a prior art microscope. Referring to FIG. 1, a microscope unit 1 incorporating an optical system is secured to and supported on a support member 2' of a focusing unit 2 which is to be moved so as to focus the optical system on an object to be observed. Further, the focusing unit 2 is slidably fitted to a pole 4 fixed erect to a stage 3 defined as a sustainer base for sustaining the microscope through the focusing unit. Focusing unit 2 is fixed in a predetermined position by a clamp 5.

It has hitherto been a general usage that the above-described microscope is used by placing the stage 3 on a working board, a desk, a table, etc. that are disposed indoors. Accordingly, there is no such conception that a strap is attached to the microscope body, and that an object to be observed is observed while employing the strap.

Due to recent increased sociological concerns regarding natural environments, including the destruction of the ozone layer, deforestation and recycling, there is an increased market demand for a microscope that can be used to observe an object outdoors, where the object is naturally found. In this way, an object can be observed outdoors, thereby eliminating having to bring the object indoors where the microscope is normally located. But when bringing the microscope outdoors, it is difficult to properly secure the microscope. As a result, there is no alternative but to observe the object while holding the microscope in ones hands or to observe the object by installing the microscope in a position in which the microscope is not properly secured. A drawback to observing an object through a microscope that is not properly secured is that the microscope may be dropped down on the ground and damaged. Further, another problem is that it is difficult for the observer to concentrate on a minute observation of the object because of the mental anxiety of damaging to the microscope.

SUMMARY OF THE INVENTION

It is a primary object of the present invention, which was contrived in view of the above problems inherent in the prior arts, to provide a microscope capable of preventing the microscope from being dropped down during an observation and readily offering a minute observation of an object to be observed by making the observer free from such a feeling of anxiety.

To accomplish the above object, according to the present invention, there is provided a microscope capable of being fitted with a strap comprising a microscope unit incorporating an optical system, a focusing unit supporting the microscope unit and movable to focus the optical system on an object to be observed, and a stage serving as a sustainer base for sustaining the microscope through the focusing unit. The same microscope is characterized by providing the focusing unit with a strap fitting portion.

Preferably, the strap fitting portion is provided in at least two positions in the vicinity of intersections of an upper surface and side surfaces of the focusing unit.

Furthermore, the strap fitting portion is preferably constructed of a plate-like member formed with strap fitting holes at both ends thereof and interposed between a front focusing body and a rear focusing body, and the two ends thereof are protruded from the two bodies.

It is preferable that the strap fitting holes be slit-like holes.

The above and other objects, features and advantages of the present invention will be explained hereinafter and may be better understood by reference to the drawings and descriptive matter which follows.

DETAILED DESCRIPTION OF THE PREFERRED EMBODIMENTS

One embodiment of a microscope according to the present invention will hereinafter be described.

Figure 4:
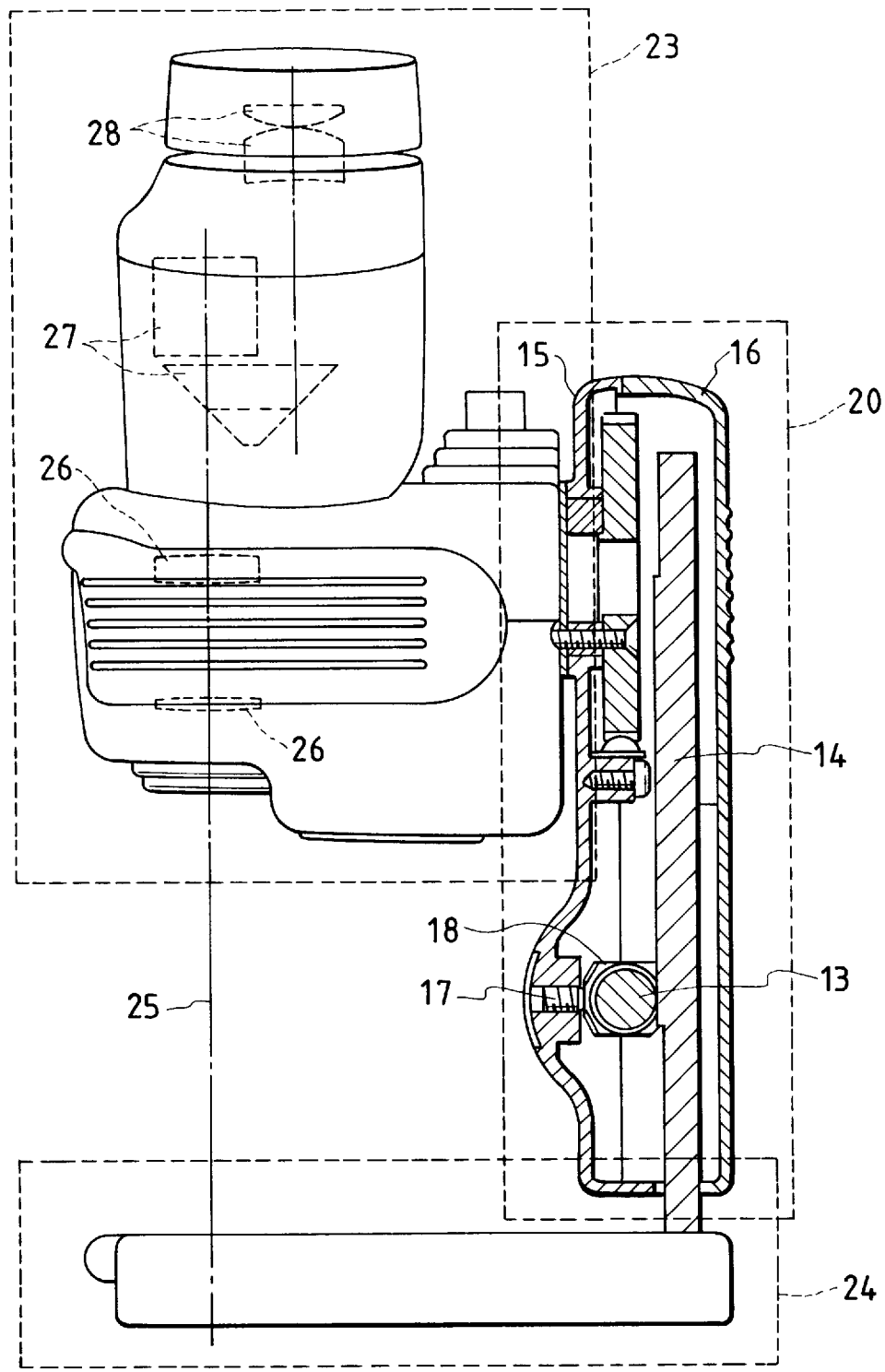
FIG. 4 is a side view showing some portions in section in the embodiment of the present invention.
Figure 5:
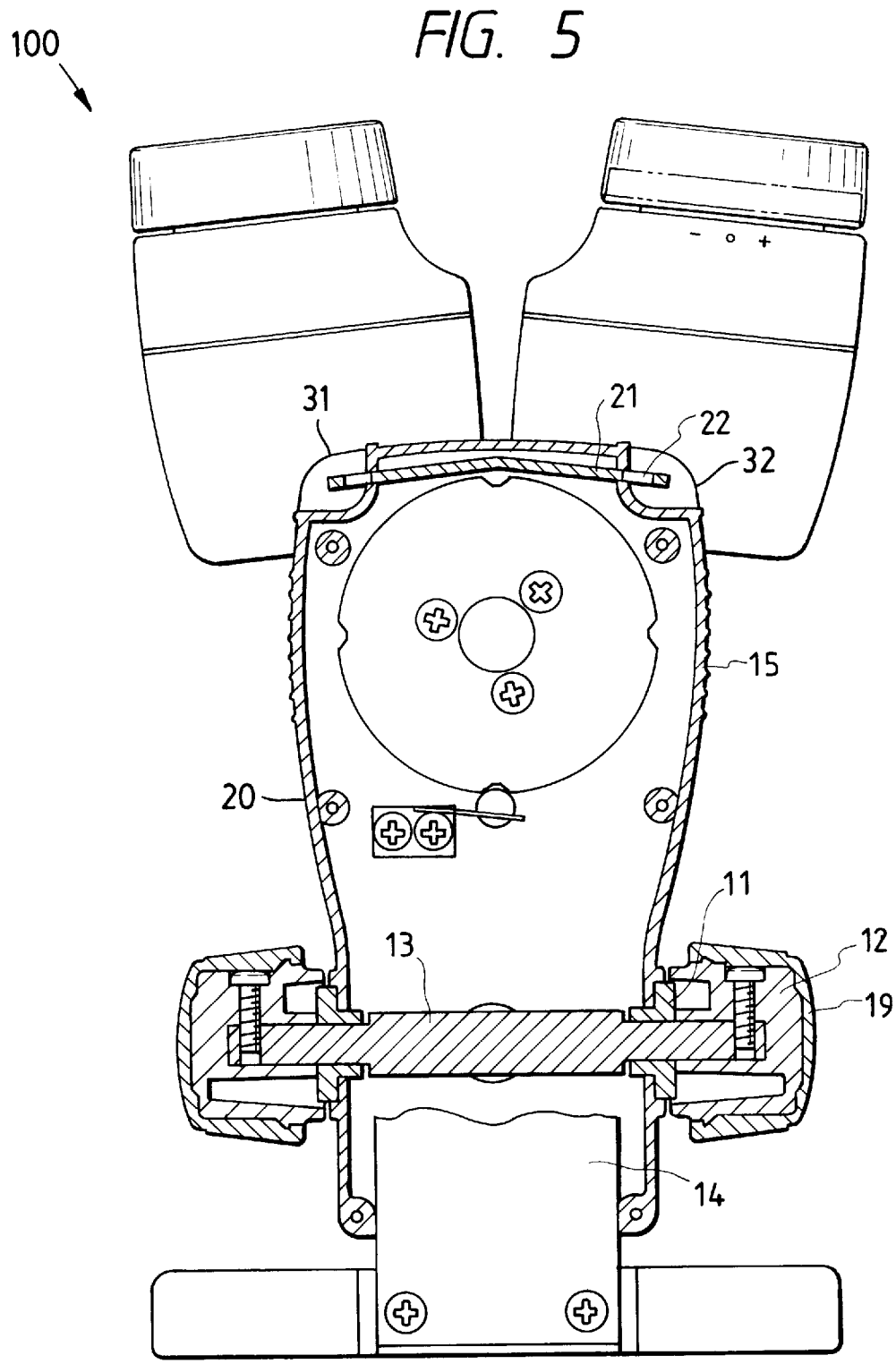
FIG. 5 is a rear view showing some portions in section in the embodiment of the present invention.

Referring to FIGS. 4 and 5, right and left bearings 11 are interposed between a front focusing body 15 and a rear focusing body 16 and fixed to the front and rear focusing bodies. A rotary shaft 13 is rotatably fitted to the bearing 11, and focusing handles 12 are fixed to both ends thereof. Further, the focusing handles 12 are covered with focusing handle rubber cover 19. A stage support 14 is sustained by two pieces of L-shaped sustaining members (unillustrated) fixed to the rear focusing body 16 and interposed between the front and rear focusing bodies 15 and 16, thereby supporting the front and rear focusing bodies slidably. A contact pressure between the rotary shaft 13 and the stage support 14 is adjustable. A mechanism for adjusting the contact pressure between the rotary shaft 13 and the stage support 14 is constructed so that positions of the right and left bearings 11 can be shifted back and forth through a single piece of bent plate 18 by fastening and slackening a push-in screw 17 fitted into the front focusing body 15, and the contact pressure therebetween can be thereby adjusted.

When the focusing handle rubber cover 19 is rotated so that the rotary shaft 13 rotates clockwise in FIG. 4, the rotary shaft 13 depresses the stage support 14 while the shaft 13 rotates. As a result, a focusing unit 20 is pushed relatively upward.

As illustrated in FIG. 5, focusing unit 20 has a left upper surface 31 and a right upper surface 32.

Figure 1:
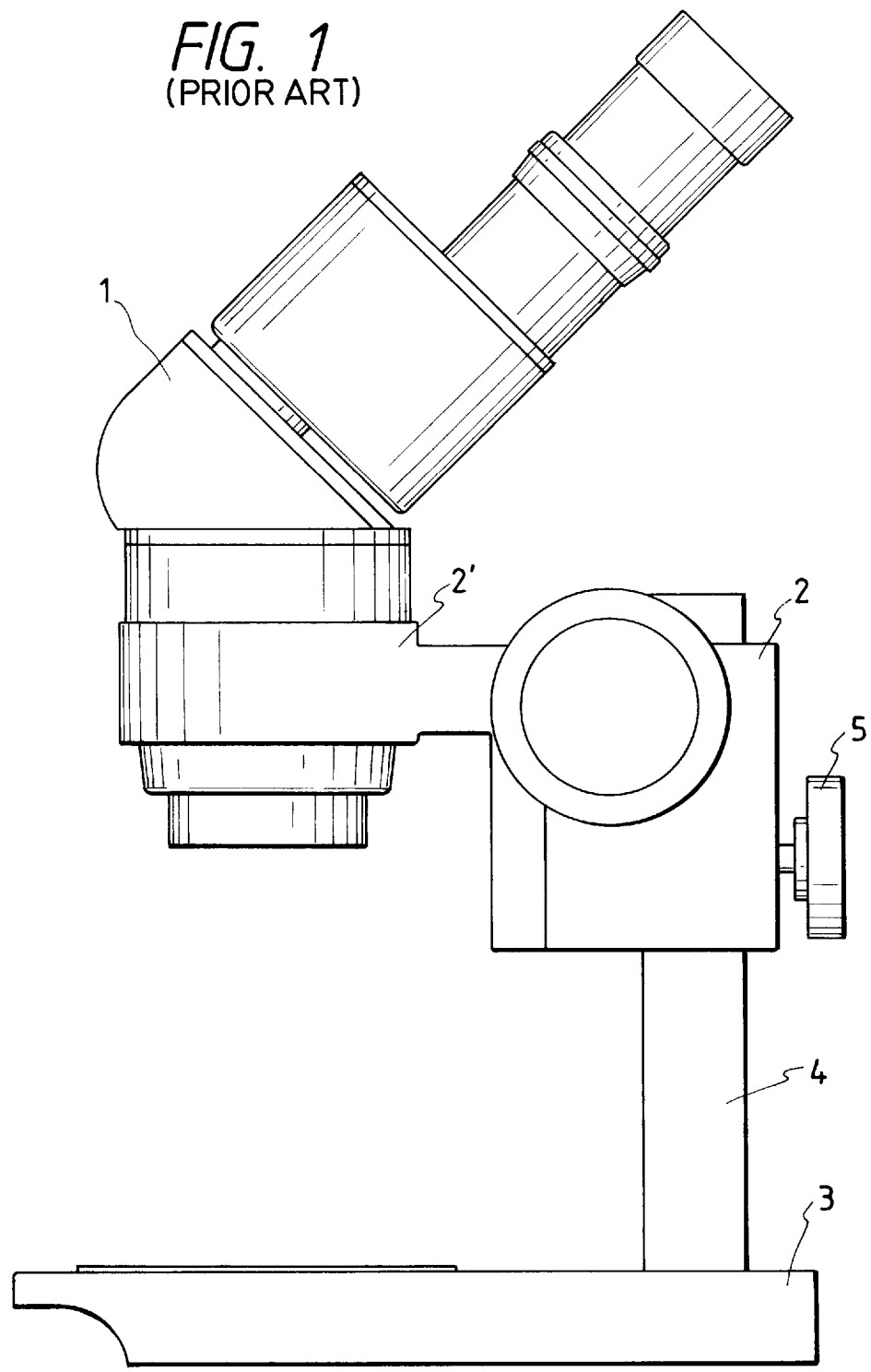
FIG. 1 is a side view illustrating an appearance of a prior art microscope.
Figure 2:
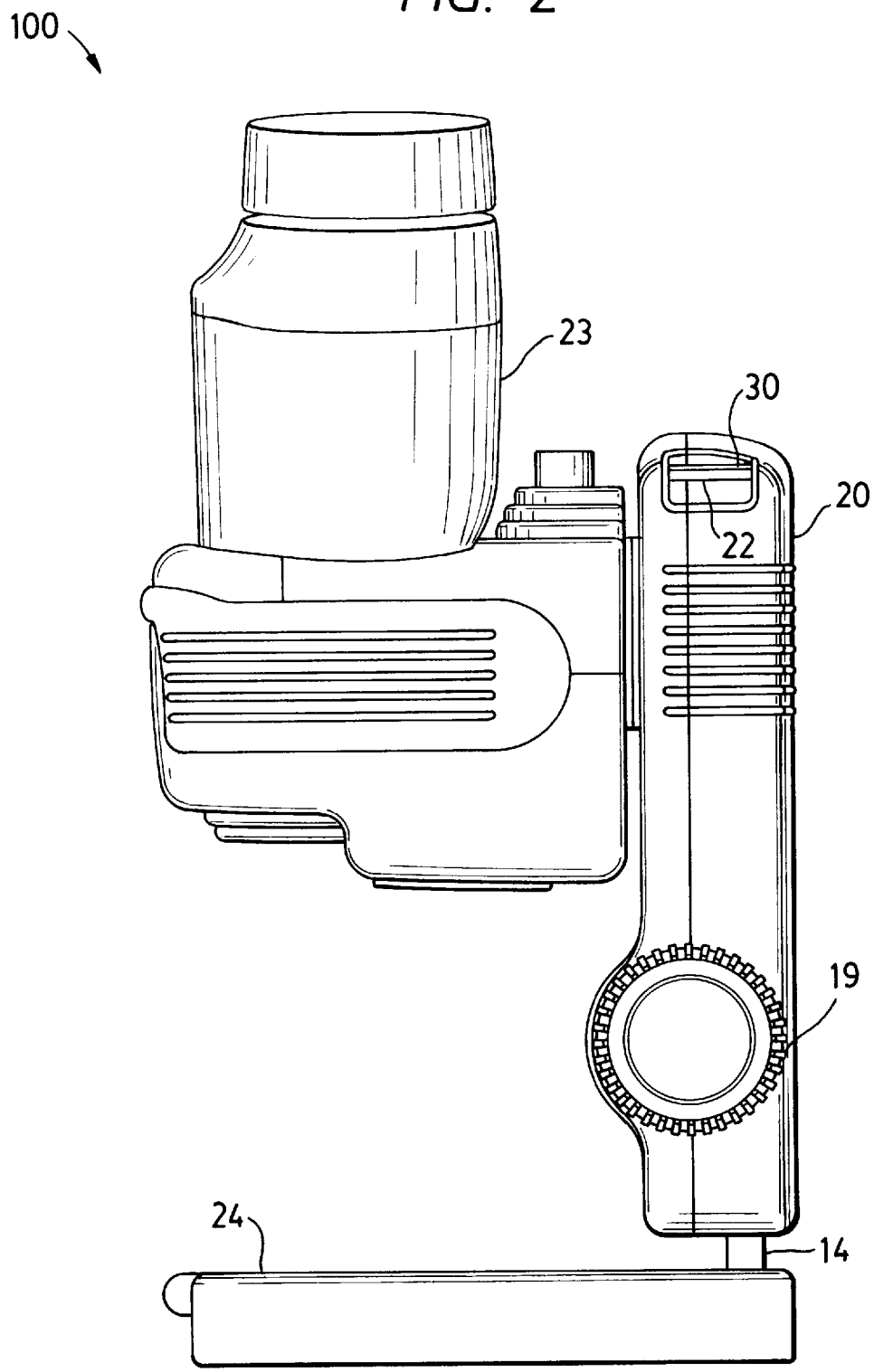
FIG. 2 is a side view of an appearance in one embodiment of the present invention.
Figure 3:
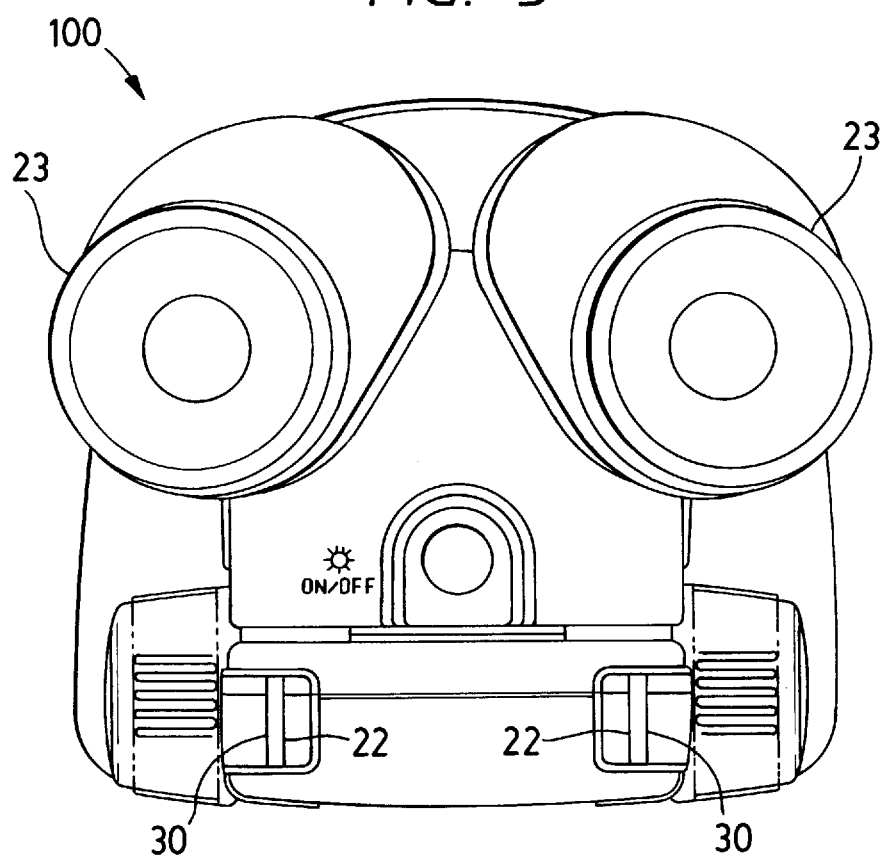
FIG. 3 is a top view of the appearance in the embodiment of the present invention.

On the other hand, a flat plate member 21 is interposed between upper portions of the front and rear bodies 15 and 16, and both ends thereof are so fixed as to protrude from the front and rear focusing portions. Slit holes 22 are formed in the two protruded ends of the flat plate member 21. As illustrated in FIGS. 2 and 3, slit holes 22 includes an elongated portion 30 that forms the holes through which the strap is inserted, which serves as a strap fitting portion. Note that the holes 22 are not confined to the slit-like shape but may, as a matter of course, take shapes corresponding to shapes and constructions of the strap.

In accordance with the embodiment of the present invention, the strap is, as described above, attached in the positions in the vicinity of the focusing unit in terms of considering a holding balance during the use thereof and various influences upon the apparatus.

Supposing that the strap fitting portion is provided at a microscope unit 23, it follows that a weight of the whole apparatus including the stage 24 and the focusing unit 20 depends on a housing for the microscope unit 23 including the optical system. As a result, the housing is deformed, and further there might be an encroachment upon the fundamental specifications of the microscope such as a deviation of the optical axis of the optical system constructed of an objective lens, a porro prism and an eyepiece of each of a left and right lens barrel. FIG. 4 shows only the optical system of the left lens barrel, i.e., an optical axis 25, an objective lens 26, a porro prism 27 and an eyepiece 28.

Further, supposing that the strap fitting portion is provided at the stage 24, the strap fitting position is lower than a centroid of the whole apparatus, and this construction easily brings about a turnover or a rotation of the microscope body.

Given under such circumstances is such a structure that the strap fitting portion is provided at the focusing unit 20, and the strap can be attached to the microscope body. If based on this structure, no extra weight is applied to the microscope unit 23 including the optical system constructed of the objective lens 26, the porro prism 27 and the eyepiece 28, and as a result, it is feasible to prevent the deviations of the optical axes of the right and left lens barrels. It is simultaneously possible to prevent the turnover and the rotation of the microscope body.

Figure 6:
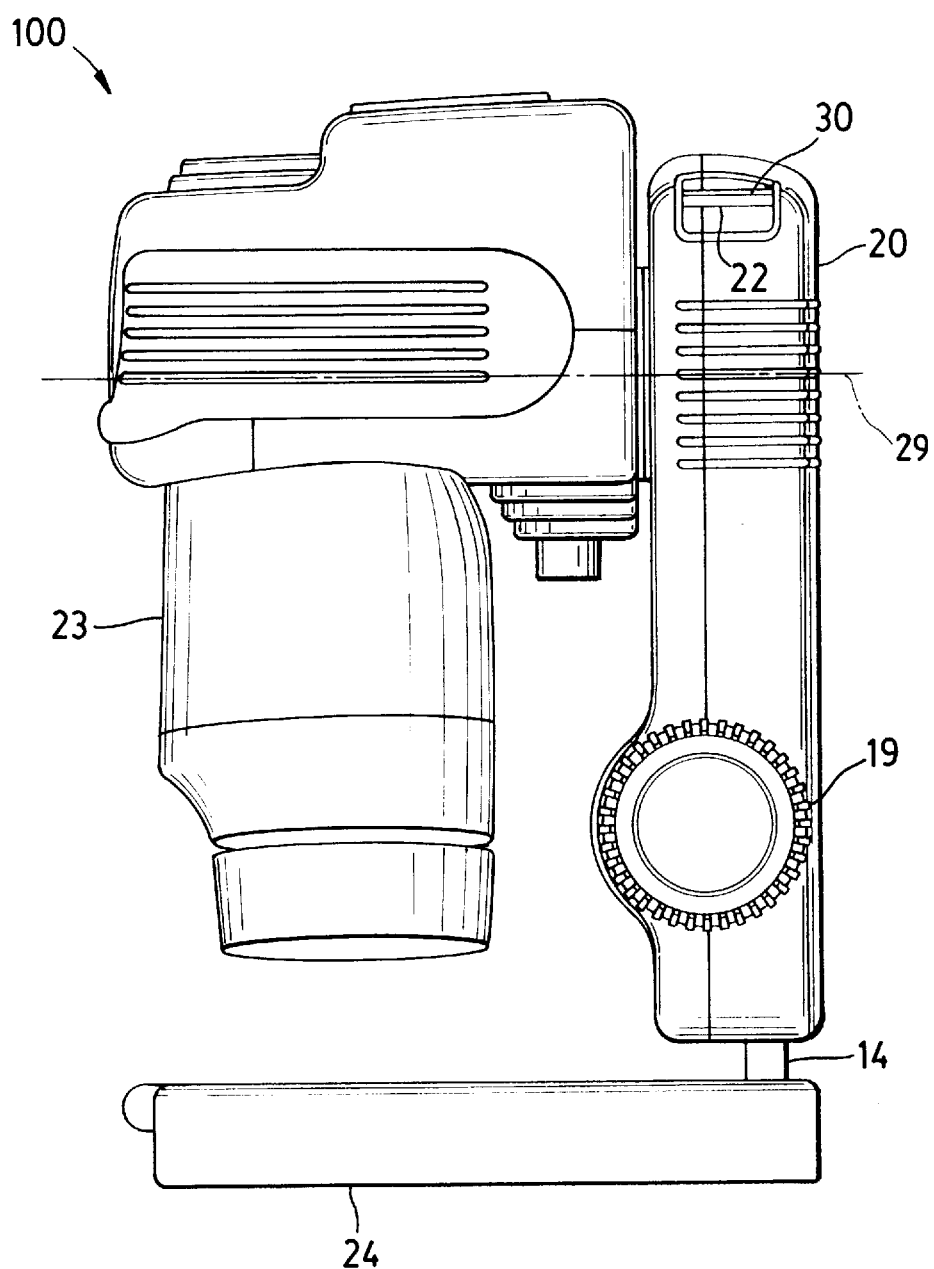
FIG. 6 is a side view of the appearance when a microscope unit is rotated through 180° in the embodiment of the present invention.

FIG. 6 is a side view illustrating an appearance of the microscope unit when the microscope unit is rotated through 180° about a rotational axis 29 of the microscope unit in the above-described embodiment of the microscope according to the present invention. The embodiment deals with a stereo-microscope with a rotary mechanism into the microscope unit. The strap fitting portion is provided at a unit, i.e., the focusing unit herein, exclusive of the microscope unit. Hence, the microscope unit is rotatable through 180°, and, besides, even when the microscope unit is inverted up and down, the weight balance of the whole microscope is not lost in such a state.

According to the present invention, the strap is attached to the focusing unit, and therefore the observer is able to make an easy well-balanced observation with the microscope body held in the hands while the strap is wound around the observer's neck.

According to the present invention, the observer is able to observe in the state of holding the microscope body in the hands while the strap is wound around the neck. In case the microscope is slipped off the hands during the observation, the microscope body is prevented from being dropped down the ground. Further, the user is released from a mental anxiety about a damage to the microscope, which is ever-incidental to the usage thereof, and can be absorbed in the minute observation of the object.

It is apparent that, in this invention, a wide range of different working modes can be formed based on the invention without deviating from the spirit and scope of the invention. This invention is not restricted by its specific working modes except being limited by the appended claims.

What is claimed is:

1. A microscope for observing an object, fitted with a strap, the microscope comprising:

a microscope unit incorporating an optical system;

a movable focusing unit supporting said microscope unit to focus said optical system on the object;

a stage unit to support said focusing unit; and a strap fitting portion to secure the strap, wherein said strap fitting portion is positioned on said focusing unit.

2. A microscope according to claim 1, said focusing unit further comprising a left upper surface and a right upper surface, wherein said strap fitting portion is positioned at the left upper surface and the right upper surface of said focusing unit.

3. A microscope according to claim 1, said moveable focusing unit further comprising a front focusing body and a rear focusing body, and said strap fitting portion further comprising a plate member having a first end and a second end, the first and second ends having a corresponding strap fitting hole, wherein said plate member extends from said front focusing body to said rear focusing body, and the first and second ends protrude from said front and rear focusing body.

4. A microscope according to claim 3, wherein said strap fitting hole is a slit.

* * * * *